April 20, 1948.　　　　O. H. DICKE　　　　2,439,846
AIRPLANE COURSE INDICATING SYSTEM
Filed April 21, 1944　　　　2 Sheets-Sheet 1

Inventor
O. H. Dicke,
By Neil W. Preston,
his Attorney

April 20, 1948. O. H. DICKE 2,439,846
AIRPLANE COURSE INDICATING SYSTEM
Filed April 21, 1944 2 Sheets-Sheet 2

Inventor
O. H. Dicke,
By Neil W. Preston,
his Attorney

Patented Apr. 20, 1948

2,439,846

UNITED STATES PATENT OFFICE 2,439,846

AIRPLANE COURSE INDICATING SYSTEM

Oscar H. Dicke, Rochester, N. Y., assignor to General Railway Signal Company, Rochester, N. Y.

Application April 21, 1944, Serial No. 532,181

18 Claims. (Cl. 343—107)

The present invention relates to course indicators or describers for airplane pilots and more particularly to apparatus for indicating through fog the course an airplane is to take by indicating the course in perspective as distinguished from apparatus for informing the pilot only whether he is to the right, to the left, or on a prescribed course. This invention is an improvement over the prior application of Field, Wight and Saint, Ser. No. 517,814, filed January 11, 1944, and no claim is intended to be made in this application to any subject matter disclosed in said prior application.

Course indicating radio apparatus now used for informing the pilot as to whether he is on a prescribed course or route, or is to the left or to the right of such route, constitute two directional radio beams which are transmitted in slightly different directions and which overlap through a comparatively small angle together with apparatus for informing the pilot whether he is flying in the overlapped portion of the two beams (flying on the route), whether he is flying to the right or to the left of such overlap portion.

There are numerous objections to the system of directing an airplane in flight used at present. One of the objections is that it is an audible information which interferes considerably with the pilot's reception of radio communication from the dispatcher. Another objection is that it is lineal information as distinguished from perspective information. A third objection is that it is difficult to keep the overlapped portion of the two radio beams on the physically prescribed ground course over which the airplane is to fly, as a result of which the entire beam swings to opposite sides of the course and therefore requires the courses to be kept further apart than should be necessary in order to prevent airplane collisions.

In accordance with the present invention, it being of course understood that a modern course indicator for airplanes must be operative through fog and clouds, it is proposed to provide ground radio transmitting stations, which transmit ultra-high frequency radio beams, at intervals and to locate these radio stations so close together on a route that at least two of these radio stations are within the transmitting range of the airplane at all times except when the airplane is about to reach the end of its route.

It is further proposed to provide apparatus on the airplane which includes a cathode ray tube and a fluorescent screen upon which the ground radio transmitting stations will visually appear in substantially the same relation as they would appear if the operator could see those stations during a clear day. In other words, on the fluorescent screen will appear a facsimile of the radio stations by electronic action in substantially the same way as if the pilot had a frosted glass plate for a windshield and if the radio stations comprised search lights directed at the airplane on a clear day. These search lights would then appear as diffused light spots on such frosted glass plate by optical action. It is proposed to provide scanning apparatus which scans areas, as distinguished from scanning lines only, and to accomplish this by mechanically operated focused antennas without rotating a body supported on a rotating body, this to avoid the accompanying gyroscopic action.

More specifically, it is proposed to provide scanning apparatus on the airplane including two or more directional or focused antennas so that these antennas can repeatedly scan a line. In order, instead of scanning the same line successively, to scan successive lines ahead of the airplane and below the earth's horizon, it is proposed to provide four or more radio wave reflectors or mirrors equally spaced about a cylinder and to have the focused antennas scan these mirrors one at a time as such mirror scans the earth's surface line after line. It is also proposed to provide amplifying apparatus for amplifying impulses that are received by these antennas from the ground radio stations through the medium of these reflectors, and to provide a kinescope the electron beam of which moves over the fluorescent screen in substantial synchronism with the movement of the directional antenna and which moves at right angles thereto in substantial synchronism with the mirror's scanning of successive lines over the field of view directly ahead of the airplane and which electron beam is active to affect said screen only when such antenna detects a reflected radio beam which originated at a radio transmitting station.

Another object of the present invention resides in the provision of markings on the fluorescent screen to indicate the center line of flight so that if the pilot maneuvers his airplane under no-wind conditions to display the plurality of ground radio stations on the kinescope screen so as to be located in a straight line on this line he will be assured of flying over the ground route, a straight course being assumed.

Another object of the present invention resides in the provision of suitable apparatus for disactively coding the radio beams emitted by the various ground stations so that the balls or spots of light on the fluorescent screen representative of these radio stations will flash in code fashion from which the pilot is informed as to which particular radio station he is approaching.

Other objects, purposes and characteristic features of the invention will in part be pointed out in the specification hereinafter and will in part be understood from the accompanying drawings in which.

Figure 1:
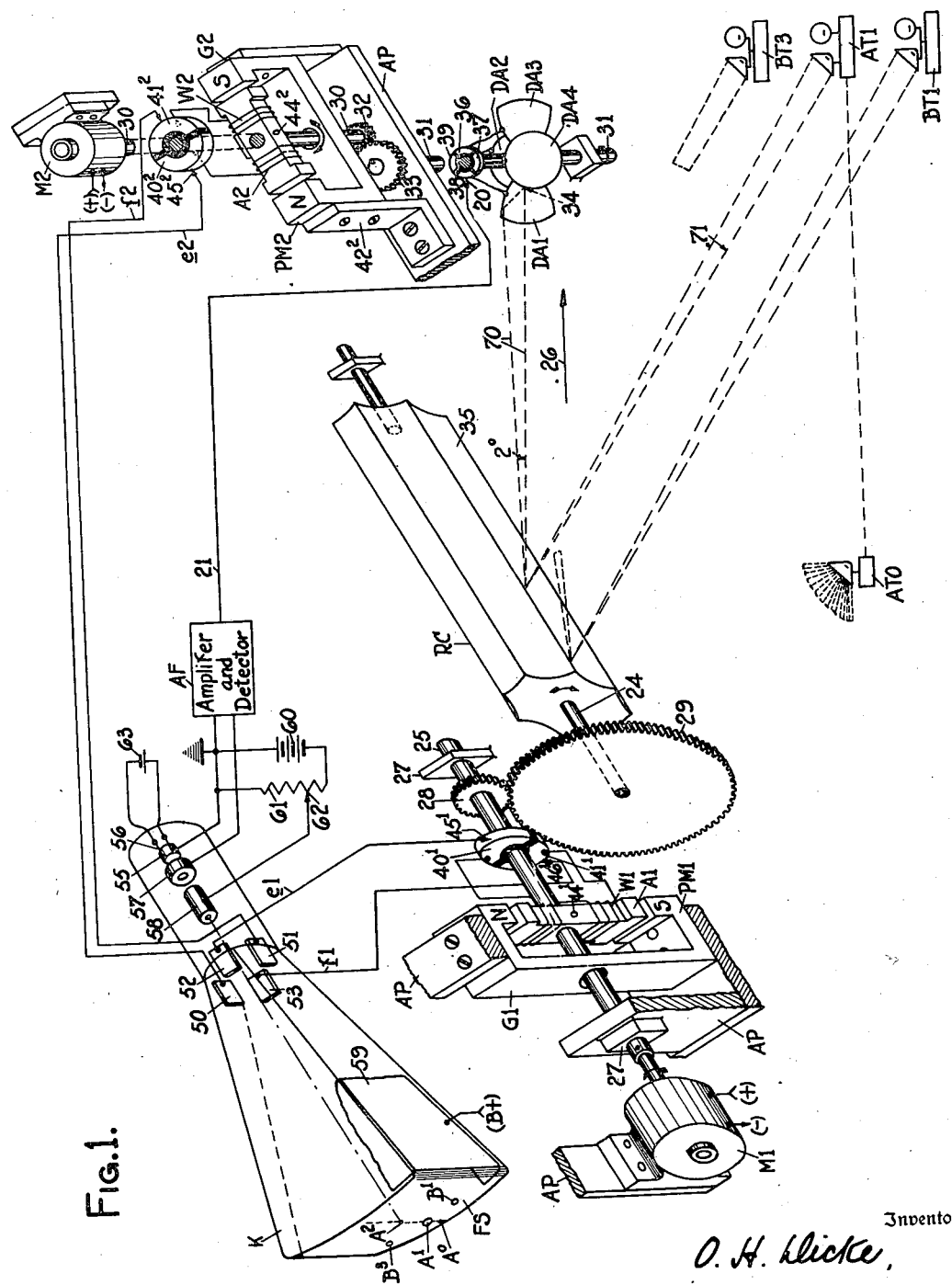
Fig. 1 illustrates conventionally one embodiment of the present invention, all apparatus of which except the four ground located antennas being located in an airplane conventionally shown by the fixed supports for this apparatus.

*Fig. 1 structure.*—Referring to Fig. 1 of the drawings, attention is directed to the two radio ray stations AT0 and AT1 and the airplane AP (shown conventionally by the brackets illustrated) which is within reception range of these two radio transmitting stations. The two sets of dotted lines connecting the airplane with each of the three antennas AT1, BT1 and BT3 each show the path over which the radiated radio beam which strikes the airplane receiver is transmitted. As shown, the south-to-north route preferably has two directional antennas at each fix near the crossing one directing radio energy southwardly and the other directing radio energy westwardly, so that the crossing is clearly indicated in the kinescope. It will be observed that only antennas AT0 and AT1 of the west-to-east route have been illustrated in the drawing although spot A² from antenna AT2 (not shown) has been illustrated on the kinescope. It should be observed that the lighted spot A¹ (Fig. 1) is brighter than the spot A² and that the spot A¹ is also brighter than either the spot B¹ or B³. This is as it should be in that the strength of the radio beam striking the airplane receiver from the antenna AT1 is stronger because the strength of the radio beam varies inversely as the square of the distance from its originating point. Also, these spots vary in size in accordance with the distance to the transmitting antenna depending in part on the resolving power of the receiving equipment.

In order to scan a surface as is necessary to produce a pictorial image of such surface by scanning action, it is desirable to move a scanning eye or detector in two directions substantially at right angles to each other. Where scanning must be done at very high speed, as is the case in the problem under consideration, it is almost physically impossible to provide such movement of a single element (scanning antenna) at the requisite speed. The applicant has thus separated his two motions by providing two elements, namely, reflectors 35 or 75 (Fig. 4) and a detector or directional antenna DA or HA (Fig. 1). These reflectors 35 (and 75) are of course properly insulated from each other and from their supporting structure and may be built in sections insulated from each other. By this construction only a single motion of each element is necessary. In the Fig. 1 structure both elements RC and DA are rotated whereas in the Fig. 4 structure focused antennas HA are rotated and reflector 75 is oscillated. By this separation of scanning in two different planes into two different structures it is possible to provide very high speed scanning without excessive strains in the apparatus such as are produced by gyroscopic action when a rotating body is supported for rotation on a rotating body. As already stated the size and brilliancy of the spots on the kinescope screen depend on the resolving power of the receiving equipment. It should be understood that the spots A⁰, A¹ and A² on the screen of the kinescope define one route which crosses a route including antennae BT1 and BT3, defined by spots B¹ and B³, the antenna AT1 being common to both routes.

In order to get a more clear understanding of how the lighted spots on the fluorescent screen FS should be located on this screen let us assume, for the purpose of analogy only, that the screen comprises a frosted piece of glass covering a portion of the windshield of the airplane and that the radio broadcasting stations on the ground are search lights directed toward the airplane. From this consideration it will readily appear that if the imaginary search lights located many miles apart are arranged in a straight line in front of and extending away from the airplane, they would appear as diffused light spots on the frosted glass and that the largest spot corresponding to the first search light on the ground would be nearest the middle bottom part of the frosted glass, that the next more distant search light would place a spot of diffused light some distance above the first one. For similar reasons if the route B crosses the route A substantially at right angle the spots on the frosted glass defining this route B would be arranged in a horizontal row. Search lights of this type can, however, not be used because they do not penetrate fog and of course would be insufficiently visible during the daytime, and for this reason invisible radio waves or radio rays which are, after reception, converted into a visible replica on the fluorescent screen of a cathode ray tube are used.

As already pointed out the replica of two radio stations AT1 and AT2 appear in a straight line above each other in that order with the spot A¹ near the bottom and the spot A² near the top.

If now the airplane, although it is on the course, should be held level and be headed toward the left, the spot A² would be shifted toward the right whereas the spot A¹ would remain in its former position on the fluorescent screen FS not only by reason of the apparatus to be described hereinafter but this would also be the case if the fluorescent screen were a frosted piece of plate glass and the radio stations were search lights during the night time.

If the airplane were to fly on its course but headed toward the left by reason of a left to right wind, that is, if it were headed into the wind enough to counteract the effect of the wind, the airplane would still fly over its course but would not be headed in the direction of the course. In this case the two spots A¹ and A² would appear on the fluorescent screen FS in exactly the same way as just explained.

If now the airplane were a considerable distance to the left of the course defined by radio stations A⁰, A¹ and A² but were headed in a direction parallel to that course, in that event the three spots depicting these stations on the fluorescent screen FS would appear to the right of the dotted center line and substantially parallel thereto.

We have thus far discussed only the results to be accomplished by the apparatus shown in Fig. 1 and it is now proposed to specifically discuss the apparatus whereby the radio way stations are visually reproduced pictorially on a fluorescent screen of the kinescope shown in Fig. 1 of the drawings. In accordance with the present invention it is proposed to radio responsively scan the field of view below the horizon and directly ahead of the airplane mechanically and at very high speed. By reason of the extremely high speed scanning that is contemplated it is deemed impracticable to scan the field of view in both directions by oscillating apparatus and for this reason it is proposed, in accordance with one form of the invention, to employ two rotating apparatuses one of which rotates about a horizontal axis at a comparatively high speed, and the other of which rotates at a much higher speed about a vertical axis.

Figure 4:
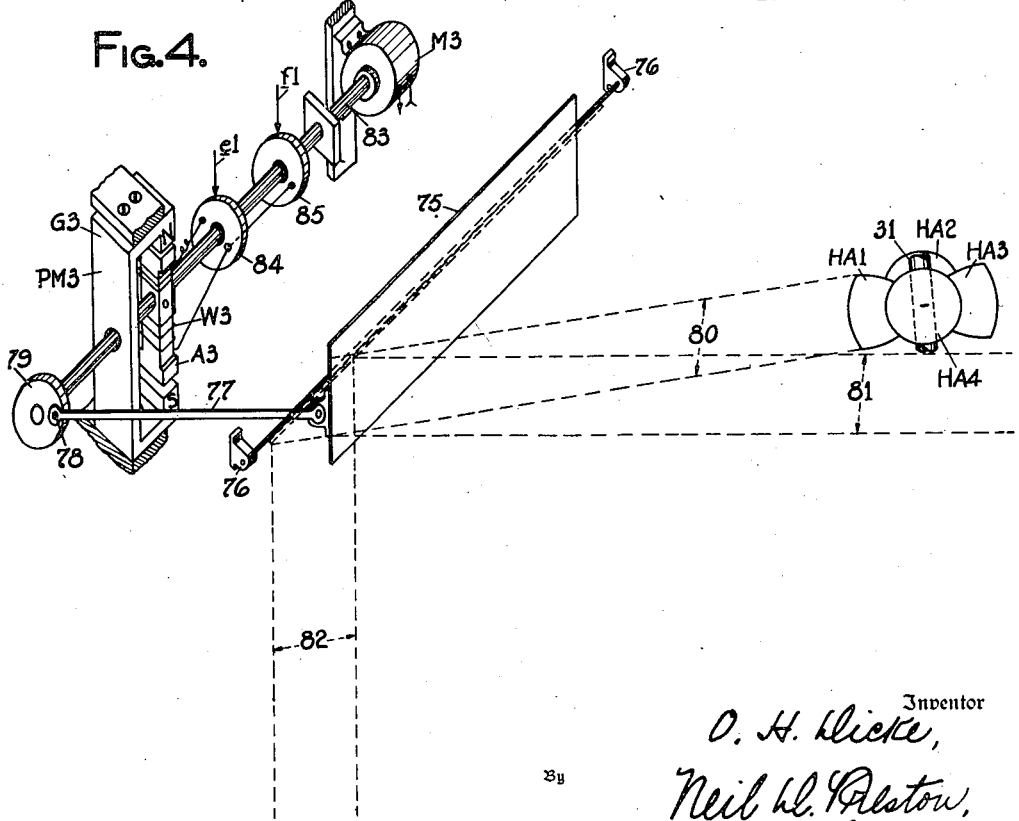
Fig. 4 shows a modified form of the invention.

In the particular embodiment of the invention illustrated in Fig. 1, although other forms of scanning apparatus employing two scanning apparatuses in series such as shown in Fig. 4, may, of course, be used, the scanning apparatus includes a main shaft 24 which is positioned horizontally with respect to the airplane and at right angles to the direction of movement of such airplane. In other words, the scanning apparatus illustrated is so oriented with respect to the direction of airplane flight as is indicated by its oriented relation to the arrow 26 (see Fig. 1) that high speed horizontal and low speed vertical scanning is accomplished.

The shaft 25 is supported by fixed bearings 27. This shaft 25 is driven by a motor M1 and is gear connected to the reflecting cylinder RC through the medium of gears 28 and 29 having a speed ratio of four to one. In a similar manner the shaft 30 is driven by another motor M2. This shaft 30 drives the shaft 31 through reduction gears 32 and 33 having a speed ratio of two to one. To the shaft 30 are secured four directional radio antennas DA1, DA2, DA3 and DA4 in such a manner that the focal axis of these radio antennas are substantially at right angles to the shaft 31 and these antennas are preferably displaced about the shaft so as to be spaced 90 degrees apart. These antennas DA1—DA4 comprise suitable metallic radio reflectors which have an antenna element 34 located in the focus thereof. These antennas elements 34 are each connected to one of the four segments 36, 37, 38 and 39 of a commutator. This commutator is engaged by a brush 20 in such manner that only the rearwardly directed antenna will be electrically connected to the contact brush 20. This contact brush 20 is in turn connected to the input side of the amplifier-detector unit AF through the medium of a wire 21.

From this construction it is readily seen that only the antenna pointing toward the reflecting drum RC will be electrically connected to the amplifier-detector AF and it is further readily seen that upon high speed rotation of the shaft 30 the focal lines of the reflectors of the directional antennas DA1—DA2 will describe substantially horizontal lines lengthwise of the reflecting drum RC. As the reflecting drum RC rotates in a clockwise direction and at a much slower speed than does shaft 31, each scanned band of the earth's surface reflected from a plane reflector 35 of the reflecting drum is scanned at a slightly different angular position of reflecting plate 35 and each such reflector 35 is scanned many (96 in preferred construction) times. In other words, if the shaft 31 rotates 24 times while the shaft 25 rotates one eighth revolution, 96 horizontal lines will be scanned over the field for each frame of observation on the screen of the kinescope. It will also readily be seen that for each 45° rotation of drum RC a new plane reflector comes within the line scanned by the focused antennas DA1—DA4 so that another 96 lines may be scanned by the focused antennas DA. This makes a total of 768 lines of scanning per revolution of the drum RC. If the field is to be scanned 16 times per second, which is considered a minimum, in that an average eye can retain vision only for about $\frac{1}{16}$ second, the speed of the drum RC will be 2 R. P. S. and the speed of the shaft 31 is 192 times as fast or 384 R. P. S. which is 23,040 R. P. M. In this connection it should be understood that as illustrated the apparatus scans through an angle of 90 horizontal degrees (45° to the right and 45° to the left of a straight ahead line) and 90 vertical degrees (from the horizon to a vertical line) and that if it is desired to scan only 45° below the horizon and if it is desired to scan only a horizontal distance of 22.5° to the right of the course of the plane and 22.5° to the left of the course of the plane, namely, if it is desired to scan an area of 45° by 45° four more directional antennas DA and eight additional plane reflectors 35 would be employed, in which event four pole generators instead of two pole generators, to be described hereinafter, would be employed. Two pole generators could of course be used if the gear ratios of gears 28—29 and 32—33 were doubled. In this case the commutator 36—39 would be required to be an eight segment commutator. In this connection it should be understood that in view of the high speed of rotation proposed for shaft 31, say 23,040 R. P. M., it would be desirable to eliminate the gear reduction afforded by gears 32 and 33 and use a four pole generator in place of the two pole generator G2 shown.

The shaft 25 is provided with a two pole generator G1 and the shaft 30 is provided with a two pole generator G2. Since these generators are identical, like parts will be designated by like reference characters having distinctive suffixes or exponents and only one of these generators, namely, generator G1 will be described. Referring to the generator G1 associated with the low speed shaft 25, this generator comprises a permanent magnet field magnet PM1 supported on the airplane AP, between the north pole N and the south pole S of this permanent magnet PM1 is supported a soft iron laminated armature A1 secured to the shaft 25 as by a pin 44[1]. On this armature A1 is provided a winding W1, which has one end electrically connected to the commutator segment 40[1] and has its other end electrically connected to the commutator segment 41[1]. Stationary brushes 45[1] and 46[1] displaced 180° about the shaft 25 engage the commutator 40[1]—41[1]. These brushes are so oriented with respect to the field magnet PM[1] that commutation from one segment to another, or pole changing of the wires e1 and f1, leading from the armature winding W1 takes place when there is substantially zero flux in the armature A1. In other words, these generators G2 and G1 do not deliver direct current as is usually the case of generators of similar construction, because they commutate the current at the maximum voltage value rather than at zero voltage value as is customarily done. The voltage delivered at the brushes therefore are of waveform substantially as illustrated in Fig. 3 of the drawings.

Figure 3:
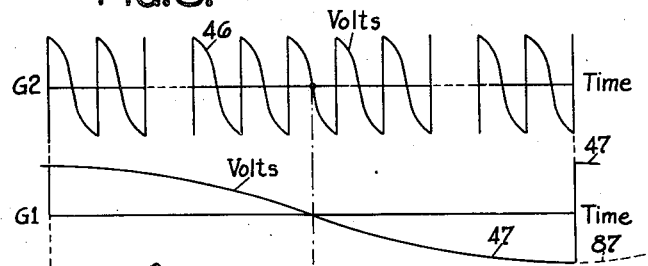
Fig. 3 shows graphs of voltages generated by the two generators directly driven by the two motors which drive the two scanning shafts.

In the upper part of Fig. 3 has been graphically illustrated the voltage fluctuation of the voltage delivered at the commutator segments $40^2$ and $41^2$ of the generator G2, and similarly, the lower portion of Fig. 3 of the drawings shows by a solid line the voltage graph of the voltage delivered by the generator G1 at its brushes during one complete rotation of the shaft 25. Since the commutator 36—39 and the commutator $40^2$—$41^2$ perform their commutating function at the same time it will be seen that the voltage delivered by the generator G2, see solid line 47 of Fig. 3, is of maximum plus value when a new focused antenna enters the field and that this voltage is of maximum minus value when such focused antenna leaves the field which is being scanned. The voltages delivered by these generators are used to deflect the electron beam of the kinescope all in a manner as hereinafter more fully described. The voltage graph for generator G2 has been shown partly omitted (see dotted lines). This has been done to illustrate that there are a large number of cycles generated by generator G2 for each cycle generated by generator G1 than are actually illustrated. For the particular construction contemplated this number is ninety-six.

Figure 2:
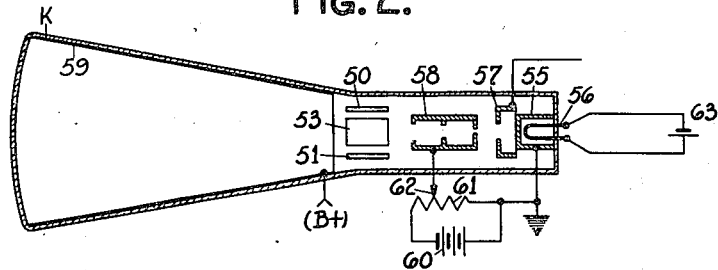
Fig. 2 illustrates in sectional elevation the kinescope shown in perspective in Fig. 1.

The cathode-ray tube K, commercially known as a kinescope, illustrated in the upper left part of Fig. 1 and in Fig. 2 of the drawings, is of well-known construction and is employed to visually indicate on a fluorescent screen FS, constituting part thereof, the pictorial location of one or more of the ground located radio transmitting antennas. Cathode-ray tubes of this construction are well known in the art for which reason the kinescope K has been illustrated rather conventionally. This kinescope comprises a fluorescent screen FS, shown in Figs. 1 and 2, over which an electron beam sweeps in a manner to be described hereinafter. This electron beam has been shown at two different positions one by a dotted line and the other by a dot and dash line. The electron beam is located in the position as shown by the dotted line when the sweep voltage delivered by the generator G2 is of maximum plus value and the sweep voltage delivered by the generator G1 is also of maximum plus value, as shown at the extreme left-hand portion of Fig. 3 of the drawings, where the dotted line below the drawing signifies that these are the voltages employed to swing the electron beam to the dotted line portion shown in Fig. 1.

Referring again to Fig. 3 it will be seen that a dot and dash line has been shown at that point in the voltage graphs where the voltage of both generators are zero. Under this condition of sweep voltages the electron beam of Fig. 1 will assume a neutral position as shown by the dot and dash lines in Fig. 1. This swing of the electron beam is accomplished by horizontally located sweep plates 50 and 51 connected to the high speed generator G2 through the medium of wire 2 and f2 and by the vertically located sweep plates 52 and 53 connected to the brushes of the low speed generator G1 through the medium of wires e1 and f1. As is well known by those skilled in the art of electronics, electrons are emitted by the heater or cathode 55 which is heated by filament 56 as through the medium of a battery 63. The electrons emitted by the cathode 55 may be controlled by a grid or controlling element 57 and may be brought to a sharp focus by the focusing or anode structure 58. A second anode 59 is provided on the inner surface of the tapered portion of the cathode-ray tube to accelerate the electrons after the grid or control element 57 has once allowed or caused these electrons to be emitted. As illustrated the focusing structure, or first anode, 58 has a potential applied thereto through the medium of the battery 60 and a potentiometer 61, so that by adjusting the slide contact 62 of this potentiometer the electron beam may be focused so as to concentrate the electrons into as narrow a beam as desired. These various elements of the kinescope K have been illustrated in section in Fig. 2 of the drawings. It should be understood that the cathode 55, the grid 57 and the anode 59 constitute the so-called electron gun, whereas the cathode 58 is the optical system for focusing the electron beam into a narrow stream. The screen FS may also be called the target.

Referring now to Fig. 3, it will be seen from the voltage graph that the voltage of the generator G2 falls from a maximum plus value to a maximum minus value repeatedly many times during one such change from maximum plus value to maximum minus value of the voltage generated by the generator G1. In practice there may be 96 or more or less cycles of voltage generated by the generator G2 (curve 46) for each cycle of voltage generated by the generator G1 (curve 47). In other words, there may be 96 or more or less horizontal lines of sweep of the electron beam for each repetition of scanning of the fluorescent screen FS as determined by a new reflector plate 35 coming into the line scanned by the focused antennas DA. In this connection it may be pointed out that these directional antennas DA are not parabolic in shape but approach the curvature of an ellipse, one conjugate foci of which is at the focus of the antennas DA and the other of which falls slightly beyond the front reflector plate 35. Referring to Fig. 1, if for a moment the antenna element 34 be assumed to be a light source, the light beam 70 emitted by the reflector formed by the directional antennas comes almost to a point or focus when it strikes the reflector 35. This is as it should be so that this beam never, or at least seldom, can strike two adjacent reflectors 35 at the same time. Still considering the antenna element 34 as a light source the beam 70 as it is reflected into the beam 71 would have the same spread continue were it not for the fact that the reflectors 35 are preferably slightly concave crosswise as distinguished from lengthwise, so that the reflected light beam 71 has a smaller spread of say one to two degrees at least in the vertical direction forward of the airplane.

If it be assumed that the ratio of the speeds of motors M1 and M2 is such that 96 lines per reflector 35 are scanned, and that each reflector 35 scans a 90° arc, these scanning lines are approximately one degree apart. If we now drop our assumption that the antenna element 34 is a light source and instead assume that it is the antenna element of the directional antenna DA, it will be readily understood that the antennas DA1—DA4 successively scan each reflector 35 ninety-six times and in turn by reflection scan the earth's surface at lines one degree apart, each scanning line having a width of from 1 to 2 degrees depending on the exact concave curvature of the reflectors 35 employed. The concave curvature of the reflectors 35 is preferably cylindrical with the axis of the cylinder parallel to the axis of the shaft 24. From this consideration it is readily understood that the restriction of focal lines which can strike the antenna element is in one plane only. That is, the area ahead of an airplane scanned at any particular instant is wider than it is high. This may result in an antenna on the ground radiating the proper carrier frequency to create a spot appearing on the screen of the kinescope somewhat wider than it actually is. This is, however, not particularly harmful in that the exact shape of the ground antenna nor its exact size on the screen are important, so long as the center of the image correctly locates the center of the ground located antenna. Since the length of the scanning beam between a reflector 35 and the antenna element 34 varies as the shaft 31 turns the image of an active ground antenna may vary in its appearance on the screen depending on whether it is displayed near the middle or near the edge of the kinescope screen. This is, however, not prohibitive in that a pilot will soon develop the correct interpretation of the replica on the kinescope screen.

The various wiring connections are so made and the number of turns and voltages are so chosen that the electron beam will preferably be located in the upper left-hand corner of the fluorescent screen FS as viewed by the pilot when a focused directional antenna DA begins to scan a new reflector 35 as this reflector enters the field of view at the upper end of the field to be scanned. At this time each of the commutators 36—39, 40¹—41¹, and 40²—41² make a new connection. Continued rotation of the shafts 24 and 31 in the direction indicated by arrows applied to these shafts cause the electron beam in the kinescope to sweep from left to right over the fluorescent screen FS, and for each sweep the electron beam is dropped a small amount as determined by the voltage change as shown by the solid line 47 in the lower part of Fig. 3 of the drawings. When the voltage generated by the generator G1 has fallen to a maximum minus value a complete scanning of fluorescent screen has been completed at the lower right-hand corner of the screen and this voltage (curve 47) abruptly rises to a maximum plus value, as shown at the extreme right in Fig. 3, to start another complete scanning of the fluorescent screen in the upper left-hand corner.

In practice, if the fluorescent screen should be scanned 16 times per second, the speed of rotation of the shaft 24 will be two revolutions per second. If it is proposed to produce a 96 line image, that is, scan the electron beam from left to right over the fluorescent screen 96 times for each movement of the electron beam from top to bottom on the fluorescent screen FS, then the shaft 31 must rotate 24 revolutions for each reflector 35 or 384 R. P. S. which is 192 times as fast as the shaft 24. If the shaft 24 rotates two revolutions per second or 120 R. P. M. then the shaft 31 must rotate 120×192 or 23,040 R. P. M. Different directions of scanning may, of course, be accomplished by properly orienting the scanning mechanism with respect to the airplane and by making the proper circuit connections.

Thus far very little has been said about the construction of the ground located radio transmitting stations AT1, BT1, BT3, etc. Each of these transmitting stations includes a radio transmitter which transmits through the medium of its antenna an ultra-high frequency radio emission. In order to visually indicate directly on the fluorescent screen FS what particular radio station is visually displayed thereon, it is proposed to code the radio beam to a particular code characteristic for that station. For instance, the particular air routes under consideration may be designated routes A and B and each of the stations may be distinguished by a number, so that the station AT1 illustrated in Fig. 1 would naturally be coded by the necessary dots and dashes to signify the letter "A" followed by the numeral "1." Similarly the radio beam emitted by ground station BT1 would be coded to signify the letter "B" followed by the numeral "1." By this construction the dots of illumination signifying these various radio stations will be flashed in code fashion which can be readily read and decoded in the mind of the pilot.

*Operation.*—Let us now observe the functioning of the apparatus as the airplane AP flies over the ground route defined by radio stations AT1, AT2, etc., as it is about to approach the station AT1 with station AT2 in advance of such station AT1. It will be understood that each time that a focused directional antenna DA1, DA2, DA3 or DA4 on the airplane points, through the medium of a reflector 35, directly at a radio station on the ground the electron beam in the kinescope will point at a position on the fluorescent screen FS corresponding to the point on the ground where such radio station is located. This is true because the sweep plates 50 and 51 will have potentials applied thereto from the generator G2 precisely in synchronism with the movement of the directional antennas DA1, DA2, DA3 and DA4 from left to right and the electron beam will be swept from top to bottom at a much slower rate by voltages applied to the sweep plates 52 and 53 delivered by the generator G1 which voltage is exactly in synchronism with the rotation of the reflector drum RC through an angle of 45°.

We have now pointed out how the electron beam in the kinescope is directed in synchronism with the direction of the focal axis of the antennas DA1, DA2, DA3 and DA4 as reflected by a reflector 35, so that whatever is detected by a focused antenna through the medium of a reflector 35 (see radio beam 71) will be detected when the electron beam in the kinescope assumes a corresponding directional position in the kinescope. Furthermore, the directional antenna DA1, DA2, DA3 or DA4 will only receive radio response from a field station when its focal axis 71 points directly at such radio station. Such reception of a radio impulse on the antenna element 34 in reflectors of the directional antennas DA1, DA2, DA3 or DA4 will be conducted through the medium of the commutators 36—39 to the lead-in wire 21 of the amplifier and detector AF. The impulses will then be amplified and detected (rectified) and will create and deliver a potential to the grid or controlling element 57 of the electron gun to cause electrons to be present in volume in the electron beam. In other words, although a swaying electron beam in the kinescope has been mentioned in the past it should be understood that this electron beam is imaginary or at least weak except when the grid or control element 57 of the electron gun has a potential applied thereto. In other words, electrons will impinge upon the fluorescent screen FS only at the scanned points where the scanning directional antenna through an associated reflector 35 picks up a radio beam of the proper carrier frequency. From this construction and functioning it is readily understood that five spots $A^0$, $A^1$, $A^2$, $B^1$ and $B^3$ of coded light will appear on the fluorescent screen FS simultaneously at positions as illustrated in Fig. 1 under the conditions described.

It should be understood that it is contemplated that the ground route defined by radio stations AT0, AT1, and AT2 is to be used for one direction of traffic only and that a similar row of radio stations may be used for directing airplanes moving in the opposite direction for route A. It is contemplated that these routes preferably be arranged side by side and more or less parallel and that they may be spaced from three to five miles apart or at some other suitable distance. If routes governing airplane movement in opposite directions are arranged parallel to each other it may be desirable to make the antennas of the ground located radio transmitting stations directional so that the beams for, say eastbound traffic, cannot reach airplanes moving in an opposite, say a westbound, direction. Also, although apparatus has been contemplated for holding the scanning mechanism of the receiver carried by the airplane level, insofar as banking of an airplane is concerned, as through the medium of a gyroscopic stabilizer and associated hydraulic or analogous operating equipment, such as shown in the prior application Ser. No. 517,814 above referred to, this stabilizing apparatus may be omitted if desired. Also, the practitioner of the invention may, if he desired, construct the fluorescent screen so as to have a persistance of fluorescence to render the image on the fluorescent screen substantially continuous, except for the codes superimposed upon the radio beams, even though the fluorescent screen is scanned at less than 16 times per second. In this connection it should be understood that the fluorescent screen must not be so slow in losing the visual image superimposed thereon that the code signifying the particular way station cannot be detected. Also, the speed of scanning must be sufficiently fast, or the code sufficiently slow, that the dots of the code of the letter N, for instance, will be scanned at least a plurality of times in order to be sure that the codes which characterize the way station will be completely reproduced on the fluorescent screen.

*Fig. 4 structure.*—In the foregoing description of the first embodiment of the invention illustrated it has been pointed out why it is necessary to so shape the directional antennas DA1, DA2, DA3 and DA4 and the reflectors 35 in a manner to result in an incident beam, such as beam 71 (Fig. 1) which is substantially conical and which has a smaller degree of spread than the reflected conical beam, such as reflected beam 70, namely, to prevent reflection from two reflectors 35 at the same time during the transition of one such reflector out of operative position and another reflector 35 into operative position. It has also been pointed out that in spite of making the reflector 35 slightly concave and in spite of making the reflector portion of the directional antennas DA substantially elliptical a certain amount of distortion of the image on the fluorescent screen FS will still result. It is not believed that such distortion of these images is harmful but nevertheless a modified form of the invention has been illustrated in Fig. 4 of the drawings in which such distortion is not present.

Referring to Fig. 4 the directional antennas HA1, HA2, HA3 and HA4 are similar to the antennas DA1, DA2, DA3 and DA4 shown in Fig. 1 and distinguish therefrom only by being provided with parabolic reflectors instead of the elliptical reflectors shown in Fig. 1. These parabolic directional radio antennas HA1, HA2, HA3 and HA4 are supported and rotated by a similar shaft 31 which is driven at substantially the same speed and is provided with a generator substantially as shown in Fig. 1 and for convenience the driving motor and the generator as well as the associated commutators have been omitted from Fig. 4.

Referring again to Fig. 4 in the form of the invention illustrated therein it is proposed to substitute for the reflecting cylinder or reflecting drum RC shown in Fig. 1 a tiltable or oscillatory plain reflector 75. This reflector 75 is preferably supported in bearings 76 and is oscillated in these bearings through the medium of a pitman rod 77 connected to a crank pin 78 on a crank wheel 79 driven by a motor M3 through the medium of a shaft 83. On this shaft is supported the armature A3 of a generator G3 including a permanent magnet PM3 and slip rings 84 and 85 which are connected to the two ends of a winding W3 on the armature A3. If it is desired to scan the field of view at the rate of 16 times per second, as contemplated in the structure illustrated in Fig. 1 of the drawings, it will be necessary for the shaft 83 to rotate only at a speed of 8 revolutions per second or 480 R. P. M. It is not believed prohibitive to oscillate the reflector plate 75 at a speed of 8 vibrations or cycles per second especially if such reflector is constructed of comparatively light material as would also be the pitman rod 77 and other associated reciprocating elements. In other words, it is contemplated that vertical scanning of the field of view would take place alternately in opposite directions whereas horizontal scanning would be from left to right as hereinbefore contemplated. For this reason it will not be necessary to commutate the energy derived from the generator G3 (see Fig. 1). That is, a voltage wave form such as shown for generator G2 in Fig. 3 of the drawings is not now desired. The sweep voltage applied to the sweep plates 50 and 51 in both forms of the invention will cause the electron beam to move comparatively slowly from left to right (viewing the fluorescent screen FS) and will move almost instantaneously from right to left as will be understood from the voltage graph shown at the top of Fig. 3.

Since it is proposed to alternately scan up and down through the medium of the reflecting plate 75 an ordinary alternating current voltage will be necessary to properly lower and lift the electron beam in the kinescope K in synchronism with the oscillation with the reflecting plate 75. For this reason the generator G3 (Fig. 4) is not provided with a commutator such as is provided for generators G1 and G2 (Fig. 1) but is instead provided with two ordinary slip rings 84 and 85 for conducting the alternating current generated in the winding W3 directly to the vertical sweep plates 52 and 53 in the kinescope K (Fig. 1). The uncommutated voltage derived from the generator G3, which is sinusoidal in wave form, is illustrated by the curves 47 and 87 in combination in Fig. 3 of the drawings. In other words, it is proposed that the reflecting plate 75, motor M3, generator G3 and associated apparatus be substituted for reflecting cylinder RC, the generator G1 and motor M1 in the Fig. 1 structure, and it is proposed to connect the two lead wires e1 and f1

(Fig. 1) directly to the slip rings 84 and 85 (Fig. 4) respectively, through the medium of suitable brushes and it is further proposed to substitute for the elliptical directional antennas DA1, DA2, DA3 and DA4 (Fig. 1) the hyperbolic directional antennas HA1, HA2, HA3 and HA4 (Fig. 4).

*Operation of Fig. 4.*—The operation of the apparatus illustrated in Fig. 4 is of course very similar to that of the apparatus illustrated in Fig. 1 and for this reason this operation need not be considered in detail. It should, however, be borne in mind that in comparing the scanning functions of the two structures, the scanning of the field of view as well as the scanning of the fluorescent screen FS by an electron beam is accomplished by lines extending from left to right which lines in the Fig. 1 structure always start at the top and end at the bottom whereas in the Fig. 4 structure such line scanning alternately starts at the top and bottom and finishes at the bottom and top respectively.

Another distinction is that substantially the entire width of the reflecting plate 75 of Fig. 4 is being scanned at all times whereas in the Fig. 1 structure a very narrow strip of a particular reflecting plate 35 is only scanned at any one time. This is accomplished by the fact that parabolic reflectors are employed in the directional antennas HA1, HA2, HA3 and HA4 shown in Fig. 4 whereas elliptical reflectors are used in the directional antennas DA1, DA2, DA3 and DA4. Since both the incident rays 81 and 82 and the reflected rays 80 (see Fig. 4) are substantially parallel rays it will be readily understood that the images on the fluorescent screen when the Fig. 4 structure is employed will be substantially accurately reproduced on the screen by reason of the fact that the reflecting plate 75 merely changes the direction without materially changing the angle of spread or shape of the radio beam that it reflects. As hereinbefore explained it is desired to scan the field of radio view at the rate of 96 lines per frame and for this reason it is contemplated that the directional antennas HA1, HA2, HA3 and HA4 of the Fig. 4 structure will be designed to have a slight spread equal to form 1 to 1.5° as a result of which there will be a slight overlap between the successive lines scanned. As illustrated in Fig. 4 of the drawings vertical scanning through the medium of the reflector 75 is accomplished through an angle of substantially 90° as is indicated by the two extreme positions of the reflector 75 illustrated by solid line and dotted line respectively, the incident radio beam 81 being illustrated for the solid line position and the incident beam 82 being shown for the dotted line position of the reflecting plate 75.

The present invention constitutes a new and useful combination of elements many of which are old and it should be understood that equivalent elements may be used in place thereof. For instance, it should be understood that suitable other forms of scanning by two apparatus in series may be used, if desired, in place of the specific scanning apparatus illustrated and similarly other arrangements for deflecting the electron beam, which may be deflected either electro-statically, as illustrated, or electro-magnetically, may be used if desired.

Having thus shown two rather specific embodiments of the present invention it should be understood that the invention may take various forms and that various changes, modifications and additions may be made without departing from the spirit or scope of this invention, so long as the general combinations of elements as defined by the scope of the following claims are employed.

What I claim as new is:

1. In an indicating system for airplanes, the combination with a plurality of fixed radio radiating apparatuses arranged along the ground to define a path over which an airplane is to fly, a display means supported within view of the pilot on such airplane, and radio responsive means including two mechanically moved scanning devices in series of which one comprises a radio reflector and the other comprises a radio detector for displaying visual images of said apparatuses on said display means by a plurality of lighted spots one for each apparatus, said spots being so juxtaposed as are the lines of sight connecting such airplane and apparatuses.

2. In a radio indicating system for airplanes, the combination with a plurality of distinctive radio code creating apparatuses on the ground arranged along the ground to define a path over which an airplane is to fly, a display means supported within view of the pilot on such airplane, and radio responsive means including a scanning reflecting device and a scanning detecting device located and operated to scan said scanning reflecting device and in turn displaying images of said apparatuses on said display means by a plurality of lighted coded spots one for each apparatus and so juxtaposed as are the lines of sight connecting such airplane and apparatuses and each blinking in accordance with its distinctive code.

3. In an indicating system for airplanes, the combination with a plurality of radio transmitters arranged along the ground to define a path over which an airplane is to fly, a display means supported within view of the pilot on such airplane, and radio responsive means including a radio reflecting scanner and a directional scanning antenna for scanning said radio reflecting scanner and including means for displaying on said display means a plurality of lighted spots one for each transmitter within receiving range of said radio responsive means, said spots being spaced relatively substantially in the same manner as said radio transmitters are arranged on the ground.

4. In an airway traffic indicating system, in combination with a plurality of spaced ground stations arranged to define airplane landmarks, means at each station for transmitting distinctively coded energy of a type not perceptible to the senses, a scanning reflector, means for moving said reflector through predetermined cycles to periodically scan said stations, airplane carried receiving means for directionally scanning said scanning reflector and in turn distinctively receiving energy originating at the plurality of stations and reflected from said reflector and including means for transforming the received energy into energy perceptible to sight in the form of a replica of the plurality of ground stations in their properly spaced and juxtaposed relationship and each blinking in accordance with the coded energy emitted by the corresponding ground station.

5. In an indicating system for airplanes, the combination with a plurality of fixed radio radiating apparatuses arranged along the ground to define marks with respect to which airplanes are to fly, a display means supported within view of the pilot on each of such airplanes, and radio responsive means for displaying visual images of said apparatuses on said display means by a plurality of lighted spots one for each apparatus said spots being juxtaposed on said display means as are the lines of sight connecting such airplane and apparatuses, said radio responsive means including a radio reflector for scanning the ground in one direction and a directional antenna operated to scan said reflector in a different direction.

6. In an airway traffic indicating system, in combination with a plurality of spaced ground stations arranged to define marks with respect to which airplanes are to fly, means at each station for transmitting distinctively coded energy of a type not perceptible to the senses, airplane carried means for directionally and distinctively receiving energy from the plurality of stations and including means for transforming the received energy into energy perceptible to sight in the form of a replica of the plurality of ground stations in their properly spaced relationship to pictorially display such routes and each replica of a station blinking in accordance with the coded energy emitted by the corresponding ground station, said airplane carried means including a scanning reflector for reflecting such energy, said reflector being operated to scan the field of view in one direction and a directional detecting scanner for scanning such reflector in a different direction to thereby ascertain the directions in which such stations are located.

7. In an indicating system for airplanes; the combination with a plurality of radio transmitting stations arranged along the ground to define marks with respect to which airplanes are to fly; a cathode ray tube having an electron gun, electron beam deflecting devices and a fluorescent screen carried by an airplane; and other airplane carried apparatus including a radio scanning reflecting means for scanning the ground ahead of such airplane, and a radio responsive scanning detecting means for scanning said reflecting means, means for controlling said deflecting devices in synchronism with said reflecting scanning means and detecting scanning means respectively and means for rendering said electron gun effective when said reflecting-detecting scanning means receives radio impulses from transmitting stations as such stations are scanned by said reflecting-detecting scanning means to display on said screen a facsimile of said stations.

8. In an indicating system for airplanes; the combination with a plurality of radio transmitting stations arranged along the ground to define marks with respect to which airplanes are to fly; a cathode ray tube having an electron gun, electron beam deflecting devices and a fluorescent screen carried by an airplane; and other airplane carried apparatus including mechanically operated radio reflecting means for scanning the earth's surface ahead of the airplane in one plane and mechanically rotated radio detecting scanning means for scanning said reflecting means in another plane, means for controlling said deflecting devices in synchronism with the operated and rotated positions of said reflecting and detecting scanning means, and means for rendering said electron gun effective when said scanning means receives radio impulses from transmitting stations as such stations are scanned by said scanning means during the movement of such airplane to display on said screen a facsimile of said stations.

9. In an indicating system for airplanes; the combination with a plurality of radio transmitting stations arranged along the ground to define marks with respect to which airplanes are to fly; a cathode ray tube having an electron gun, electron beam deflecting devices and a fluorescent screen carried by an airplane; and other airplane carried apparatus including mechanically oscillated reflecting means oscillated to scan the earth's surface and mechanically rotated radio responsive scanning detecting means rotated to scan said reflecting means, means including electric current generators rotated with said scanning means for controlling said deflecting devices in synchronism with the oscillation and rotation of said scanning means, and means for rendering said electron gun effective when said scanning detecting means receives radio impulses from said scanning reflecting means originating at said transmitting stations as such stations are scanned by said scanning means during the movement of said airplane to display on said screen a facsimile of said stations.

10. In combination, a directional radio antenna, a first shaft supporting for rotation said directional radio antenna, an elongated radio reflecting mirror for reflecting at its various operated positions various strips of a field to be scanned, a second shaft for supporting and rotating said radio reflecting mirror, the two shafts being so oriented and spaced that said directional antenna upon rotation of said first shaft scans said radio reflecting mirror lengthwise to scan one of such strips, a kinescope having electron beam producing and vertical and horizontal electron beam deflecting means, a generator for each of said shafts one generator having its supply leads connected to said vertical beam deflecting means and the other generator having its supply leads connected to said horizontal beam deflecting means, and means for increasing the electron flow in said electron beam each time a directional antenna detects a radio station through the medium of said reflecting mirror.

11. In combination, a plurality of directional radio antennas, a first shaft supporting for rotation said plurality of directional radio antennas, an elongated radio reflecting mirror for reflecting at its various rotated positions various strips of a field to be scanned, a second shaft for supporting and rotating said reflecting mirror, the two shafts being so oriented and spaced that said directional antennas upon rotation of said first shaft scans said radio reflecting mirror lengthwise to scan one of such strips, a kinescope having electron beam producing and vertical and horizontal electron beam deflecting means, a generator for each of said shafts one generator having its output leads connected to said vertical beam deflecting means and the other generator having its output leads connected to said horizontal beam deflecting means, and means for increasing the electron flow in said electron beam each time a directional antenna detects a radio station through the medium of said reflecting mirror.

12. In combination, a directional radio antenna, a first shaft supporting for rotation said directional radio antenna, a second shaft, an elongated radio reflecting mirror for reflecting at its various oscillated positions various strips of a field to be scanned and oscillated by the rotation of said second shaft, the two shafts being so oriented and spaced that said directional antenna upon rotation of said first shaft scans said radio reflecting mirror lengthwise to scan one of such strips, a kinescope having electron beam producing and vertical and horizontal electron beam deflecting means, a generator for each of said shafts one generator delivering sinusoidal alternating current and having its supply leads connected to said vertical beam deflecting means and the other generator delivering sawtooth voltage sweep cycles and having its supply leads connected to said horizontal beam deflecting means, and means for increasing the electron flow in said electron beam each time a directional antenna detects a radio station through the medium of said reflecting mirror.

13. In combination, a directional antenna, a shaft for rotating said antenna so supporting said antenna that the direction of reception of said antenna is substantially at right angles to the axis of said shaft, a radio reflector, another shaft for bodily supporting said radio reflector rotatable with its axis substantially at right angles to the axis of said first mentioned shaft, and means for driving said shafts at speeds such that the speed of one of said shafts is many times that of the speed of the other shaft.

14. In combination, a directional antenna, a shaft for rotating said antenna so supporting said antenna that the direction of reception of said antenna is substantially at right angles to the axis of said shaft, a radio beam reflector, another shaft for bodily supporting said radio beam reflector rotatable with its axis substantially at right angles to the axis of said first mentioned shaft, means for driving said shafts at speeds such that the speed of one of said shafts is many times that of the speed of the other shaft, and means for generating scanning voltages of frequencies proportional to the speeds of rotation of said shafts.

15. In combination, a plurality of elliptically shaped directional radio antennas, a first shaft for supporting said antennas, a second shaft, an elongated radio reflecting mirror for reflecting at its various rotated positions various strips of a field to be scanned and rotated by said second shaft, the two shafts being so oriented and spaced that said directional antennas upon rotation of said first shaft scans said radio reflecting mirror lengthwise to scan one of such strips, a kinescope having electron beam producing and vertical and horizontal electron beam deflecting means, a generator for each of said shafts one generator having its output leads connected to said vertical beam deflecting means and the other generator having its output leads connected to said horizontal beam deflecting means, and means for increasing the electron flow in said electron beam each time a directional antenna detects a radio station through the medium of said reflecting mirror.

16. In a course indicating system for airplanes, the combination with a plurality of radio transmitting stations arranged in a row on the ground to define an air route over which airplanes are to travel, a cathode ray tube on an airplane including a fluorescent screen and an electron gun, scanning apparatus for radio responsively scanning the field of view ahead of such airplane including a scanning reflector, means for supporting and operating said reflector to scan such field of view, a scanning detector, means for supporting and operating said detector to cause scanning of said reflector, and means for rendering said electron gun active each instant said scanning apparatus detects a radio transmitting station and for directing the electrons emitted by said gun to a point on said screen conforming to the location in the field where the radio transmitting station which activated said gun is located, whereby the pilot is informed by a replica in perspective on said fluorescent screen as to the location of the ground route and its radio stations.

17. In combination, a plurality of elliptically shaped directional antennas, a first shaft supporting for rotating said directional radio antenna, a second shaft, an elongated radio reflecting mirror of slightly crosswise concave shape for reflecting at its various rotated positions various strips of a field to be scanned and rotated by said second shaft, the axis of said two shafts being so oriented and spaced that said directional antennas upon rotation of said first shaft scan said radio reflecting mirror lengthwise to scan one of such strips, a kinescope provided with electron beam producing and vertical and horizontal electron beam deflecting means, a generator for each said shafts delivering falling voltage saw-tooth sweep cycles and having their supply leads connected to said vertical and horizontal beam deflecting means, and means for increasing the electron flow in said electron beam each time a directional antenna detects a radio station through the medium of said reflecting mirror.

18. In combination, a directional antenna, a shaft for rotating said antenna so supporting said antenna that the direction of reception of said antenna is substantially at right angles to the axis of said shaft, a radio reflector, another shaft for bodily supporting said radio reflector rotatable with its axis substantially at right angles to the axis of said first mentioned shaft, means for driving said shafts at speeds such that the speed of one of said shafts is many times that of the speed of the other shaft, a cathode-ray tube including beam deflecting devices and an electron gun, means for controlling said deflecting device in accordance with the rotation of said shafts, and means for rendering said gun active each time said directional antenna receives radio radiation.

OSCAR H. DICKE.

REFERENCES CITED

The following references are of record in the file of this patent:

UNITED STATES PATENTS

| Number | Name | Date |
|---|---|---|
| 2,130,913 | Tolson | Sept. 20, 1938 |
| 2,151,549 | Becker | Mar. 21, 1939 |
| 2,216,707 | George | Oct. 1, 1940 |
| 2,226,860 | Greig | Dec. 21, 1940 |
| 2,279,246 | Podliasky et al. | Apr. 7, 1942 |